United States Patent
Koskinen

(10) Patent No.: US 6,788,673 B1
(45) Date of Patent: Sep. 7, 2004

(54) METHOD FOR CONNECTING TELEPHONE CALLS IN A MOBILE COMMUNICATION SYSTEM

(75) Inventor: Topi Koskinen, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 764 days.

(21) Appl. No.: 09/650,692

(22) Filed: Aug. 29, 2000

(30) Foreign Application Priority Data

Aug. 30, 1999 (FI) ............................................ 19991833

(51) Int. Cl.⁷ .............................................. H04Q 7/32
(52) U.S. Cl. ...................................... 370/352; 455/415
(58) Field of Search ................................ 370/352, 328, 370/338; 455/414.1, 415, 445

(56) References Cited

U.S. PATENT DOCUMENTS

| | | | |
|---|---|---|---|
| 5,363,429 A | 11/1994 | Fujisawa | 379/58 |
| 5,553,125 A | 9/1996 | Martensson | 379/140 |
| 5,729,542 A * | 3/1998 | Dupont | 370/346 |
| 5,761,195 A * | 6/1998 | Lu et al. | 370/329 |
| 5,905,958 A | 5/1999 | Houde | 455/437 |
| 6,473,422 B2 * | 10/2002 | Hall et al. | 370/352 |
| 6,594,253 B1 * | 7/2003 | Sallberg et al. | 370/349 |

FOREIGN PATENT DOCUMENTS

| | | | | |
|---|---|---|---|---|
| WO | WO 97/26764 | * | 1/1997 | H04Q/7/22 |
| WO | WO 97/26764 | | 7/1997 | |
| WO | WO 99/56479 | | 11/1999 | |

OTHER PUBLICATIONS

GSM Standard, 03.60, Version 6.2.0, Chapter 5.4.5.

* cited by examiner

Primary Examiner—Chi Pham
Assistant Examiner—Derrick W Ferris
(74) Attorney, Agent, or Firm—Perman & Green, LLP

(57) ABSTRACT

The invention relates to a method for answering a phone call coming to a mobile terminal in a situation where a packet-switched connection is active in the mobile terminal. At least one reference item (PN, UN, GNO, CL1) has been saved in the mobile terminal. The method comprises a reception step, wherein information about an incoming call is received to the mobile terminal (MS). The method also comprises at least an examination step, wherein received information about a phone call is examined in a mobile terminal (MS) for finding at least one item of caller line identification (CLI), and it is examined whether reference items (PN, UN, GNO, CL1) have been saved in the mobile station (MS). Then, if at least one reference item (PN, UN, GNO, CL1) has been saved, a comparison step is carried out in the method, in which step said at least one reference item (PN, UN, GNO, CL1) is compared to said at least one item of caller line identity information (CLI) discovered in the examination step. After that, a decision step is carried out in the method, in which step it is decided whether the call is answered or not. The decision is made on the basis of the comparison performed in said comparison step, if a comparison step was carried out.

31 Claims, 5 Drawing Sheets

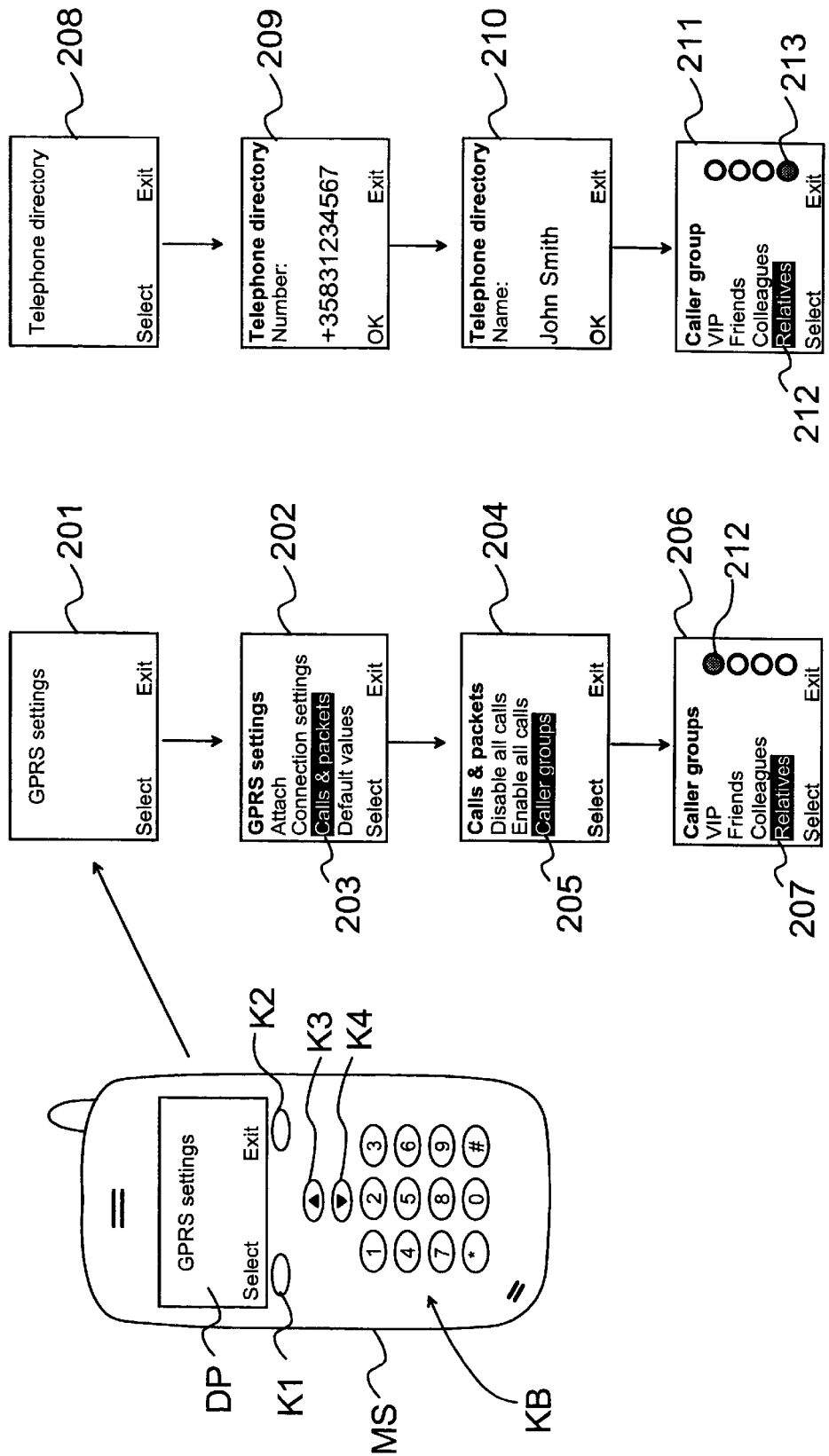

Figure 1:
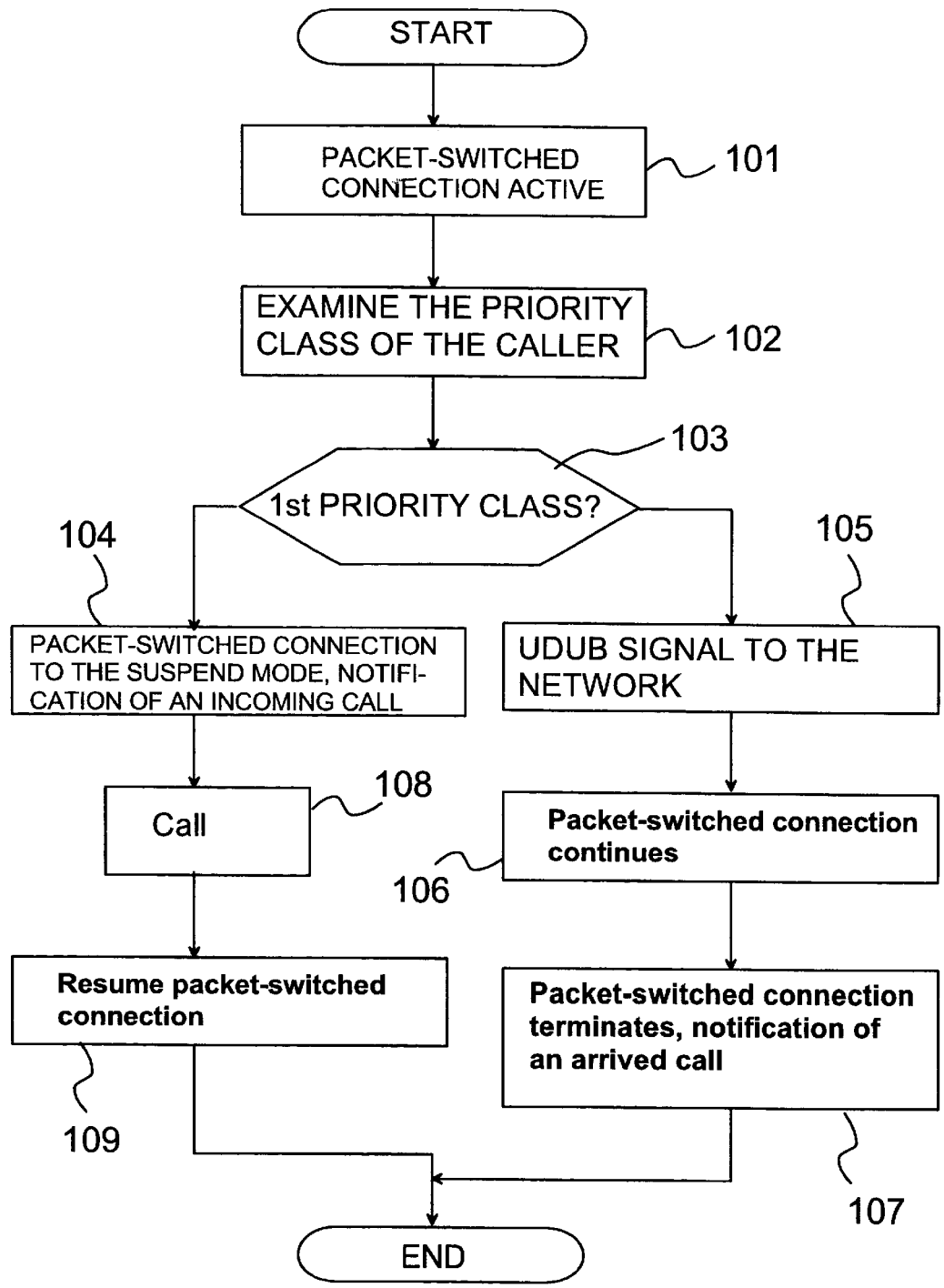

| PN | UN | GR | CL1 |
|---|---|---|---|
| 35831234567 | John Smith | 4 | 1 |
| 35892214582 | Client 1, CEO | 0 | 0 |
| 35833333001 | Superior | 1 | 0 |
| 35829874567 | Tom Jones | 3 | 1 |

DB1

Fig. 3a

| GNO | GNM | CL2 |
|---|---|---|
| 1 | VIP | 0 |
| 2 | Friends | 1 |
| 3 | Colleagues | 1 |
| 4 | Relatives | 1 |

DB2

Fig. 3b

METHOD FOR CONNECTING TELEPHONE CALLS IN A MOBILE COMMUNICATION SYSTEM

The present invention relates to a method for answering a telephone call coming to a mobile terminal in a situation where there is a packet-switched connection active in the mobile terminal, into which mobile terminal at least one reference item can be saved, and in which method a reception step is carried out, in which step information about the incoming call is received to the mobile terminal. The invention also relates to a mobile terminal, which comprises means for answering an incoming call in a situation where there is a packet-switched connection active in the mobile terminal, which mobile terminal comprises means for saving at least one reference item, and means for receiving information associated with the incoming call. Furthermore, the invention relates to a data transfer system comprising means for establishing a packet-switched connection between a mobile communication network and a mobile terminal, means for initiating a telephone call between the mobile communication network and the mobile terminal, means for associating at least one identifier with the telephone call, and means for saving at least one reference item, and which mobile terminal comprises means for answering an incoming call in a situation where a packet-switched connection is active in the mobile terminal.

The possibility to use packet-switched connections in addition to the common circuit-switched connections is being developed for mobile communication systems, such as the GSM system. A General Packet Radio Service (GPRS service) is being developed to the GSM mobile communication system for implementing packet-switched connections. The GPRS service enables, among other things, the use of the Internet Protocol and the X.25 data transfer protocol, short message service (SMS), e-mail transmission and wireless application protocol (WAP) applications. A packet-switched data transfer connection like this enables a data transmission method, which is more efficient than a circuit-switched connection, and which is especially suitable for asynchronous data transfer, because in a packet-switched connection the resources of the mobile communication system are not allocated for the duration of the whole connection, but only for the time required for the transmission of the packets. As a contrast to this, in a circuit-switched connection the connection is allocated for the whole time when the connection is active. By means of the packet-switched connection, the user of a mobile station can, for instance, keep an e-mail application activated all the time, whereby the user immediately detects an incoming e-mail message. Because the packet-switched connection allocates resources only according to need, it may also offer lower cost of telephone calls compared to the use of a circuit-switched connection.

The GSM standard 03.60 version 6.2.0 chapter 5.4.5 presents three modes of operation for a mobile station of the GPRS system: class A, class B and class C. Mobile stations can be divided into these classes according to the types of packet network properties implemented in them. Mobile stations of class A can use the GPRS services and other GSM services simultaneously. Mobile stations of class B can monitor the signals of the GPRS network and the control channel of the GSM network simultaneously, but they can use only either GPRS services or GSM services simultaneously. Mobile stations of class C can use a circuit-switched connection and a packet-switched GPRS connection, but not simultaneously.

In practice, a mobile station of class B can receive pagings associated with initiating a circuit-switched connection even when the mobile station is using GPRS services, e.g. has an active packet-switched connection. Then the mobile station can receive a CS paging message notifying of an incoming call, for instance, but it cannot operate in a circuit-switched and a packet-switched connection simultaneously. Then if a message associated with a circuit-switched connection arrives in the mobile station, the packet-switched connection is set in a suspended mode for the duration of the reception of the message and a possible circuit-switched connection, until the circuit-switched connection has been terminated. In an ideal situation this means that the mobile station can switch its mode between a packet-switched connection and a circuit-switched connection, and after the switching resume the mode of operation in which the mobile station was when the interruption arrived. In practice, however, it has been found that applications using a packet-switched connection, such as e-mail or an FTP application used for file transfer, are disconnected even during a relatively short interruption. An interruption like this can be caused even by a break of a few seconds, such as signalling a circuit-switched telephone call to a level which enables alerting for the call.

One way of preventing the applications from being disconnected is to disable all circuit-switched call attempts during a packet-switched connection. Then, however, telephone calls which the user would like to receive even during a packet-switched connection are also disabled.

Another possibility is that the user can select whether to receive the incoming call or not. In the modern mobile stations it is possible to show information about the caller, such as the Caller Line Identity (CLI), which shows the calling number. Then the user can see from whom the call is coming and make his/her decision on the basis of that. However, this arrangement has the drawback that the time that passes from the arrival of the call signal to the decision about reception can be so long that the active application using a packet-switched connection can stop running.

It is an objective of the present invention to provide a method and a system in which it is possible to establish a circuit-switched connection during a packet-switched connection, when required. The invention is based on the idea that at least a first and a second priority class is specified, and a telephone number is classified as belonging to either of the priority classes, whereby, if the request to establish a circuit-switched connection comes from a telephone number belonging to the first priority class, the circuit-switched connection is established, but in other cases the circuit-switched connection is not established. The method according to the present invention is characterised in that it comprises at least the following steps:

an examination step, in which the information received about a telephone call is examined in order to find at least one item of identification information, and to find out if whether reference items have been saved in the mobile terminal, whereby if at least one reference item has been saved, a comparison step is performed in the method, wherein said at least one reference item and said at least one item of identification information found in the examination step are compared, and a decision step in which the decision about answering the phone call is made, and which decision is based on the comparison performed in said comparison step, if the comparison step was carried out.

The mobile terminal according to the present invention is characterised in that it comprises at least:

examination means for finding at least one item of identification information from the information received, comparison means for comparing at least one reference item with the at least one item of identification information discovered in the examination means and for producing a comparison result, and decision means for making the decision about answering the phone call on the basis of the comparison result produced by the comparison means.

A data transfer system according to the present invention is characterised in that it comprises at least:

examination means for finding at least one item of identification information from the information received in the mobile terminal, comparison means for comparing at least one reference item with the at least one item of identification information discovered in the examination means and for producing a comparison result, and decision means for making the decision about answering the phone call in the mobile terminal on the basis of the comparison result produced by the comparison means.

The present invention provides important advantages. When the method according to the invention is applied, disconnection of the packet-switched connection can be avoided especially in situations where the request to initiate a circuit-switched connection comes from a telephone number classified to a lower priority group. In that case, the user is not disturbed, either, because no ringing tone is produced in these situations. However, the user can define important telephone numbers, from which all incoming calls are connected regardless of whether the user has an active packet-switched connection or not. In a preferred embodiment of the invention, even in these situations the user can be given an opportunity to decide whether to receive the call or not. When the packet-switched connection is not interrupted when less important phone calls are coming, the packet-switched connection is not as likely to be disconnected as in the prior art solutions. Thus the user can specify in advance from which telephone numbers interruptions to the packet-switched connection are allowed.

In a method according to another preferred embodiment of the invention, the caller can, when required, specify whether the call is connected to the receiving number even in a situation that the receiver has an active packet-switched connection. In this arrangement, passwords or other identifiers can be used, if required, to prevent unauthorised interruptions of the packet-switched connection.

Figure 4A:
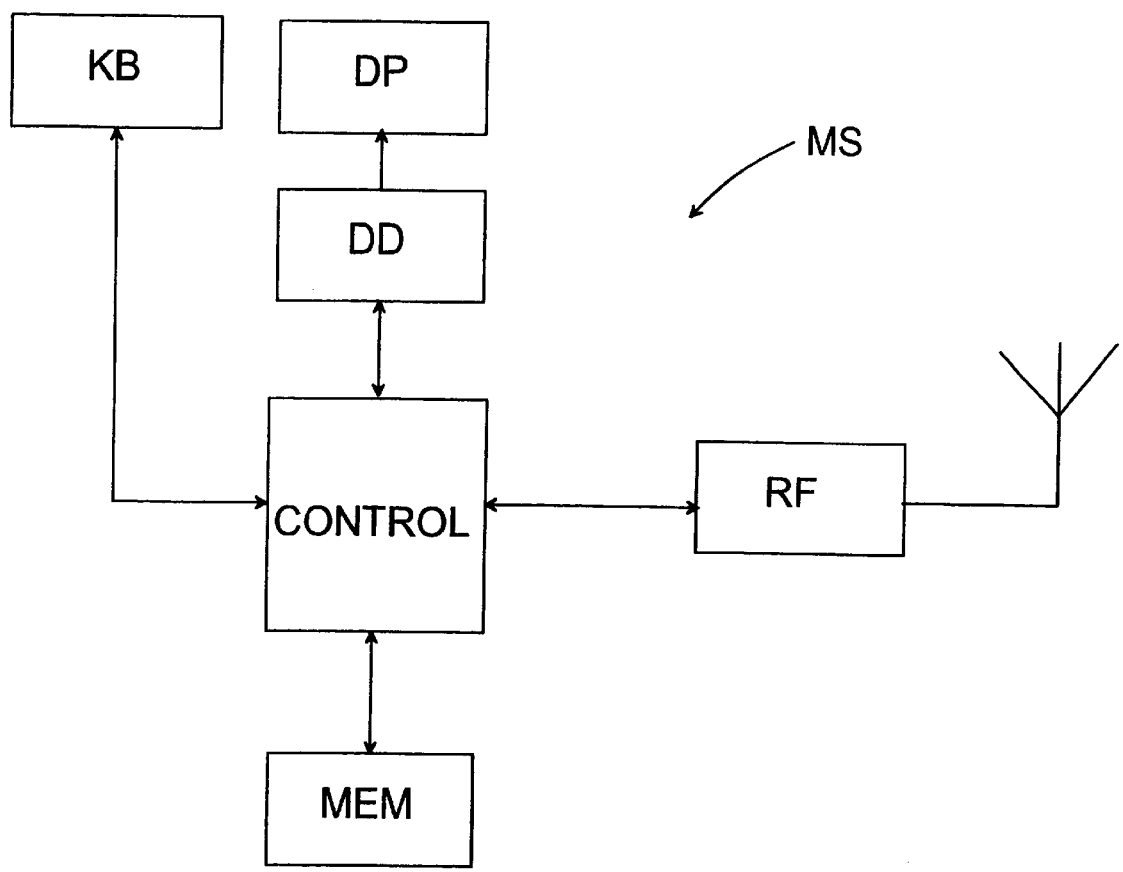
Figure 4B:
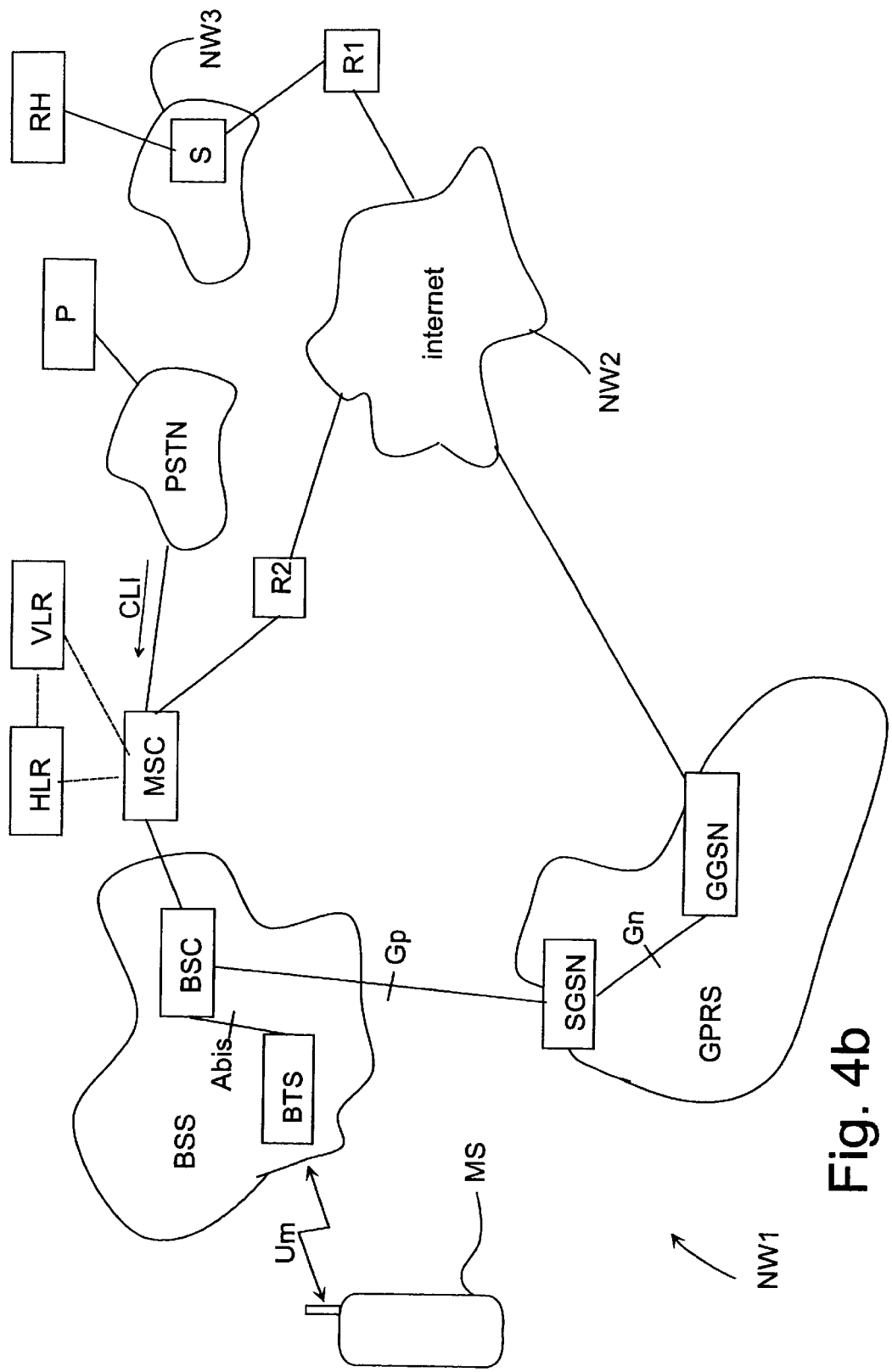

In the following, the invention will be described in more detail with reference to the accompanying drawings, in which FIG. 1 shows a method according to a preferred embodiment of the invention as a simplified flowchart, FIG. 2a is a simplified illustration of a mobile terminal embodying the invention, FIG. 2b shows an example of specifying the priority class in a mobile terminal according to a preferred embodiment of the invention, FIG. 2c shows an example of specifying a caller group in a mobile terminal according to a preferred embodiment of the invention, FIG. 3a shows an example of the caller's identification information saved in a mobile station according to a preferred embodiment of the invention, FIG. 3b shows an example of caller groups saved in a mobile station according to a preferred embodiment of the invention, FIG. 4a shows a mobile terminal according to a preferred embodiment of the invention as a simplified block diagram, and FIG. 4b illustrates a mobile communication system embodying the invention, FIG. 1 shows the operation of a method according to a preferred embodiment of the invention in a mobile communication system NW1 as a simplified flowchart. The user has established a packet-switched connection to a mobile communication system with a mobile station MS. A mobile terminal MT can be, for instance, a mobile station with communication properties, such as the Nokia 9110 Communicator, or it can consist of a mobile station and a data processing device, between which a data transfer connection has been provided. An example of such a mobile terminal MT is a portable computer, which has a mobile station in card form, such as a GSM mobile station, connected to it. A mobile terminal MT comprises means for establishing both a circuit switched connection (CS) and a packet switched connection to a mobile communication system NW1.

FIG. 4a shows a mobile terminal MT according to a preferred embodiment of the invention as a simplified block diagram. Some operational blocks that are important for the description of the invention are shown in the figure. A mobile terminal MT includes a processor block CONTROL, which can be implemented by one or several processors, such as a microprocessor, a digital signal processing unit, etc., as known as such in the art. This processor block can also be implemented as a part of an Application Specific Integrated Circuit (ASIC), in which other operations of a mobile terminal can also be implemented. For saving information, the mobile terminal MT includes a memory MEM, such as read memory, read/write memory and/or non-volatile reprogrammable memory. The radio part RF comprises means for carrying out radio data transfer to the base transceiver station BTS. In addition, the mobile terminal MT preferably comprises a keyboard KB, a display DP and a display driver DD. In practice, a mobile terminal MT can be implemented in many different ways. A mobile terminal MT can be formed as one complete entity, such as the Nokia 9110 Communicator, or it can comprise a separate data transfer device, such as a mobile station, and a data processing device, such as a portable computer, whereby a local data transfer connection has been provided between these units.

FIG. 4b is a simplified block diagram of a mobile communication system NW1 embodying the invention. This mobile communication system NW1 comprises the properties of the GSM and GPRS mobile communication systems but naturally the invention can also be applied in other mobile communication systems, in which both packet switched and circuit switched connections are available. The blocks that are central to the operation of the mobile communication system NW1 are shown in FIG. 4b. The Serving GPRS Support Node (SGSN) controls the operation of the packet switching service on the side of the cellular network. The serving GPRS support node takes care of the attach to and detach from the network of the mobile station MS, updating the location of the mobile station MS and directing the data packets to the right addresses. The mobile station MS is connected to the base station subsystem BSS via a radio interface Um. The base station subsystem is connected to the serving support node SGSN via a BSS-SGSN interface Gp. In the base station subsystem BSS, the base transceiver station BTS and the base station controller BSC are interconnected by a BTS-BSC interface called Abis. The serving support nodes SGSN can communicate with other serving support nodes SGSN by means of the Gateway GPRS Support Node (GGSN).

The mobile stations communicate with the base transceiver stations BTS via the radio interface Um. The base stations are controlled by Base Station Controllers (BSC), which have a data transfer connection to the Mobile Switching Centre (MSC). The base station controller BSC and the base transceiver stations BTS connected to it are also called the Base Station Subsystem (BSS). The connection interface used in a circuit switched connection between a mobile switching centre MSC and a base station subsystem BSS is called the A interface. Correspondingly, the interface between a base station controller BSC and a base transceiver station BTS is called the Abis interface. The operations of a mobile switching centre MSC include controlling the incoming and outgoing calls, like a telephone exchange of a Public Switched Telephone Network PSTN, (not shown). In addition, the mobile switching centre MSC carries out measures that are necessary in mobile communications, such as the mobility management of the mobile station by means of e.g. a Home Location Register (HLR) and a Visitor Location Register (VLR): Via a mobile switching centre MSC it is also possible to establish a circuit switched connection to, for instance, the Internet data network NW2 preferably via one or more routers R2.

FIG. 3a shows an example of how the reference items used in determining the priority class can be saved in the mobile terminal MT. A telephone directory database DB1, for instance, has been formed in the memory means MEM, in which database information ID of different persons/ companies etc., such as telephone number PN, name UN, caller group identification GNO and priority class CL1 has been saved. A telephone directory database DB1 can consist of many such items of directory information ID, as is known a such. The telephone number PN is preferably saved as numbers. The name UN is saved as letters and possibly also numbers. The identifier of the caller group GNO is saved, for instance, as numbers. Thus the information of the caller group specified for a telephone number can be retrieved from the caller group database DB2. A caller group is not necessarily specified for all the telephone directory information saved in the directory database DB1. In that case, however, the priority class can be saved in the priority class field CL1 of the directory database DB1.

FIG. 3b shows an example of how caller group information can be saved in a mobile terminal MT. A caller group database DB2 is preferably formed in the memory means MEM of the mobile terminal, in which database names of different caller groups GNM, the caller group identifiers GNO and the caller group priority class CL2 have been saved. A caller group database DB2 can consist of many such items of directory information GNM, GNO, CL2, as is known as such.

The caller group identifier GNO is preferably saved as numbers. The caller group name UN is saved as letters and possibly also numbers. The priority class CL1, CL2, is saved as numbers, for instance, or if there are two of the priority classes CL, the priority class CL1, CL2 can be saved in one bit, the value of which is set as either 0 or 1. The value 0 then denotes e.g. the first priority class and the value 1 the second priority class.

It is obvious that other methods for specifying and saving information than those presented above in connection with the directory database DB1 and the caller group database DB2 can be used in connection with embodiments of the invention.

The operation of a method according to a preferred embodiment of the invention will be described in the following. For example, the user has started an e-mail application or a WEB browser application with a data processing device. With the WEB browser application the user can examine, for instance, information contained in a server S, which is connected to the Internet data network NW2 via a router R1 and a local area network NW3, as is known as such in the art. The user can also receive an e-mail message sent from a workstation RH connected to a local area network NW3. A packet-switched connection has been activated in a mobile station MS, whereby information can be transmitted as packets between the mobile communication system NW1 and the mobile station MS, as is known as such in the art. This is illustrated by block 101 in the flowchart of FIG. 1. When a call is coming to the mobile terminal MS, e.g. from a telephone P of a public switched telephone network PSTN, a reception step is carried out in the mobile terminal, where, for instance, information about the incoming call is received. In addition, an examination step is carried out, where the caller identification information CLI transmitted in connection with the call, such as the calling telephone number, is examined. Preferably it is also examined in the examination step whether any reference items have been saved in the mobile terminal MS. If at least one reference item is found, the calling line identification information CLI is compared to at least one reference item saved in the mobile terminal MS, such as the information of the telephone directory database DB1 or corresponding information (block 102), preferably a telephone number PN. If a telephone number PN corresponding to the caller line identity CLI is found in the telephone directory database DB1, an examination step is preferably carried out (block 103), in which it is examined what the priority class specified for the telephone number PN is. This can be carried out so that it is examined at first in which caller group the telephone number belongs. If a caller group (e.g. the caller group identifier ≠0) has been specified in the telephone directory information, the caller group identifier GNO is retrieved from the directory data ID. On the basis of this caller group identifier GNO, the priority class CL2 specified for this caller group can be found out from the caller group database DB2. If a caller group has not been specified (e.g. the caller group identifier=0), the priority class specified for the telephone number PN is examined from the priority class information CL1 of the telephone directory database DB1.

After that, a decision step is carried out in the method, in which step it is decided whether the call is answered or not. In the decision step, the priority class discovered in the examination step is preferably used as a criterion for the decision-making. If the priority class is the first priority class, operation continues from block 104. Then the mobile terminal MS sets the packet-switched connection in the suspended mode and produces a ringing tone to inform the user of the incoming call. At the same time, the mobile terminal MS can show the caller's telephone number or a corresponding name on the display. If the priority class specified for the caller is not the first priority class, or if there was no priority class information, operation moves from block 103 to block 105. Then the telephone call is not established, and as a response to the mobile communication system NW1 the mobile terminal MS preferably sends a User Determined User Busy (UDUB) signal. The packet-switched connection is then resumed normally (block 106). After the user has terminated the packet-switched connection, he/she is preferably notified of an arrived call, which was not answered, and possibly also of the telephone number CLI, from which the call was coming (block 107).

If the call was answered and the packet-switched connection was set in a suspended mode for the duration of the call (block 108), the packet-switched connection is resumed to the active mode (block 109) when the call has terminated. After this, the packet-switched connection is continued normally.

The invention can also be applied so that in a situation where a call is coming from a telephone number of the first priority class, the user is notified of the incoming call and given the identification information of this telephone number. The user is then given an opportunity to choose whether to receive the call or to continue the packet-switched connection. If the call is received, the packet-switched connection is set in the suspended mode and reactivated when the call has terminated. If the call is not received, the packet-switched connection is continued, and information about the call attempt, such as the caller's telephone number CLI, is preferably saved.

In all situations the caller cannot be identified, or the priority class of the telephone number PN is not found out. This is possible e.g. when the caller has specified his/her telephone number as secret. Also in a situation where the call is coming from another country, the caller line identification information CLI is not always transmitted to the receiving terminal equipment, whereby the identification of the caller and the priority class is usually not possible. Other reasons for not being able to find out the priority class of the caller include the fact that the user has not selected a priority class for the caller group, which has been specified for the telephone number. In cases like this, the caller is preferably placed in a previously selected priority class, such as the second priority class, and operation will then continue in accordance with calls of this priority class.

In the case that no reference items are saved in the mobile terminal, the comparison step is preferably not carried out. Then the decision about answering the call can be made in the decision step so that the user makes the answering decision. The user may also have saved in the mobile terminal MT in advance information about whether the call is answered or not, if no reference items have been saved. One more preferred alternative for operation is that the manufacturer of the device or the operator of the mobile communication network has saved in the mobile terminal MS the information whether to answer the call or not, if no reference items have been saved.

A method according to another preferred embodiment of the invention in a situation where the user of a mobile terminal MS has an active packet-switched connection will be described in the following. When a call is coming to a mobile terminal MS, the caller is preferably notified that the receiver has an active packet-switched connection. Then the caller can either disconnect the attempted call, or send to the mobile terminal MS of the receiving party a command to suspend the packet-switched connection, whereby the mobile terminal MS sets the packet-switched connection in a suspended mode and starts to receive the call. This command to suspend the packet-switched connection can be implemented e.g. so that the user keys in a certain series of numbers or the like with the keyboard of the telephone (not shown), which series of numbers is transmitted to the receiving mobile terminal MS. Then this command to suspend the packet-switched connection is used as at least one item of identification information, which in the comparison step is compared to the reference items saved in the mobile terminal. In this preferred embodiment, these reference items include the command to suspend the packet-switched connection. Then the receiving mobile terminal MS identifies the arrived command to suspend the packet-switched connection and thereafter performs the measures required to suspend the packet-switched connection and to answer the call. In this respect, corresponding steps as those in the method according to the first preferred embodiment of the invention, can be used in connection with the invention in a phone call coming from a telephone number classified to the first priority class. Here in connection with the second preferred embodiment of the invention it is also possible to use a password or other identifier in addition to the command to suspend the packet-switched connection in order to prevent unauthorised interruptions of the packet-switched connection.

This second preferred embodiment of the invention can also be applied so that the user specifies e.g. in the caller group database DB2 whether a person belonging to the caller group is allowed to suspend a packet-switched connection or not. This specification can preferably also be made individually for each telephone number. This arrangement has the advantage that the user can give the possibility to interrupt a packet-switched connection to the persons he/she wants, e.g. the persons classified to the first priority class. In that case, a call coming from such a person is not automatically connected, but the caller can consider whether it is necessary to connect the call immediately or if it can wait until the receiver has disconnected the packet-switched connection.

In the following, a preferred embodiment of the invention in which the user specifies a priority class to selected telephone numbers will be described with reference to FIG. 2b. FIG. 2b shows examples of messages, which are shown on the display DP (FIG. 2a) of the mobile terminal in this connection. In the example of FIG. 2b, the text of the menu line being active is shown as inverse, that is, light text on a dark background. Naturally, in practical applications the form and content of these messages can differ from those shown by way of example. By means of the menu operations of the mobile terminal, the user has selected the packet-switched network settings operation. This is illustrated by block 201 in FIG. 2b. The user activates this packet-switched network settings operation preferably with a function key K1, whereby different alternatives are shown (block 202). For instance, the user selects the call setting function (denoted by the reference number 203 in FIG. 2b) by means of the arrow keys K3, K4. This sets up a call setting function menu (block 204). In this menu, caller group settings 205 can be selected, whereby it is possible to specify priority classes for different caller groups (block 206). Block 206 illustrates some caller groups, such as VIP, friends, colleagues, relatives. Preferably by using the arrow keys K3, K4, the user can activate the caller group whose priority class should be changed. Changing can then be done preferably by the function key K1, whereby the priority class of the activated caller group is changed (1./2.). In the example of FIG. 2b, the group "relatives" has been activated (marked with the reference number 207), whereby the user can change the priority class of this caller group with the function key K1. In FIG. 2b, a shaded circle has been used to denote the options in which the priority class has been set as the first priority class (e.g. the VIP alternative, reference number 212). With the exit key K2, the operation is preferably returned to the previous level in the menu, as is known as such in the art.

In the following, the specification of a caller group for a telephone number will be described with reference to FIG. 2c. In this example of FIG. 2c, the text of the menu line being active is also presented as inverse. By means of the menu operations of the mobile terminal, the user has selected the telephone directory operation. This is illustrated by block 208 in FIG. 2c. The user activates this telephone directory operation with the function key K1, whereby the user is asked to give a telephone number (block 209). The user keys in a telephone number with the keyboard KB, whereby the input is ended by the function key K1, for instance. In the next step, the user is asked to give an identifier associated with the telephone number, such as the name of the person, preferably with the keyboard KB (block 210). The user is also asked to specify to which caller group this telephone number belongs (block 211). The caller groups that can be selected have preferably been saved by the user in advance in the mobile terminal MS. The caller groups or some of them can also be default caller groups, which may have been saved already in connection with the manufacture of the mobile terminal. Block 211 and correspondingly FIG. 3b illustrate some caller groups, such as VIP, friends, colleagues, relatives. Preferably by using the arrow keys K3, K4, the user can select the caller group to which the telephone number should be added. The setting can then be performed preferably with the function key K1, whereby the selected caller group is saved in the mobile terminal MT as the caller group of the given telephone number. In the example of FIG. 2c, the caller group relatives has been selected (denoted with the reference number 212). With the priority class specification of a caller group, a priority class can be selected for all telephone numbers belonging to the caller group. Naturally, the invention can also be applied so that the user can specify a priority class separately for each telephone number, regardless of whether a caller group has been specified for the telephone number or not. The telephone number need not be accompanied by a name, either, whereby its additional information merely consist of the caller group and/or the priority class.

When the specifications have been performed, the user exits the setting menu. The information is saved in the memory means MEM of the mobile terminal and/or the memory means of the Subscriber Identity Module SIM (not shown). The telephone number is saved in the telephone number field PN, the identifier associated with the telephone number is saved in the user name field UN, and the caller group identifier is saved in the caller group identifier field GNO in the directory database DB1. If a caller group was not specified, the priority class is saved in the priority class field CL1 of the directory database DB1.

The priority class can also be saved in connection with the telephone number so that when changes or additions are made to the telephone number, the priority class information CL2 of the caller group specified for the telephone number is copied to the directory database DB1 from the caller group database DB2. Correspondingly, if changes or additions are made in the caller group specifications, the priority class information CL2 of the changed caller groups are copied from the caller group database DB2 to the telephone directory database DB1 to the telephone directory information ID, where the caller group is one of the changed caller groups. This arrangement provides the advantage that when a telephone call comes, the priority class CL2 need not be examined from the caller group database separately, but the priority class information CL1 found in the telephone directory database is used as the priority class information.

A method according to the invention can be implemented largely as program commands of the processor block CONTROL of the mobile terminal MS. It is obvious that a subscriber identity module (SIM, not shown), which is known as such, can also be used for performing the operations needed to apply the invention. A subscriber identity module like this is typically attached to a mobile terminal MS, whereby the user can use the operations of the mobile communication network, which the operator of the mobile communication network offers to the user and which are supported by the mobile terminal MS.

Although the reference items ID, PN, UN, GNO, CL1 were saved in the mobile terminal MS in the embodiments described above, the invention can also be applied so that reference items are saved in another place of the mobile communication system NW1 or other data transfer system. One such example is a data transfer system comprising a local area network NW3 (FIG. 4b), with which the mobile terminal MS can have a data transfer connection. A local area network like this typically comprises at least one server computer S, whereby the reference items ID, PN, UN, GNO, CL1 can be saved in connection with the server. Then the mobile terminal MS can retrieve comparison data from the server, when required.

The present invention is not limited only to methods, mobile communication systems NW1 and mobile terminals MS in which only said first and second priority class are available. It is possible to define e.g. a third priority class, whereby in case of telephone calls belonging to the third priority class, the user can be sent notification of the incoming call and the identification information of the telephone number. The user is then given an opportunity to choose whether to receive the call or to continue the packet-switched connection.

The present invention is not limited to the above described embodiments only, but its details can be modified without departing from the scope defined by the attached claims.

What is claimed is:

1. A method for answering a telephone call coming to a mobile terminal (MS) in a situation where there is a packet-switched connection active in the mobile terminal (MS), into which mobile terminal (MS) at least one reference item (PN, UN, GNO, CL1) can be saved, and in which method a reception step is carried out, during which information about the incoming telephone call is received to the mobile terminal (MS), characterised in that the method also comprises at least the following steps:

the examination step, in which the information received about a telephone call is examined in the mobile terminal (MS) in order to find at least one item of caller line identity information (CLI), and to find out whether at least one reference item (PN, UN, GNO, CL1), has been saved in the mobile terminal (MT), whereby if at last one reference item (PN, UN, GNO, CL1), has been saved, a comparison step is carried out in the method, wherein said at least one reference item (PN, UN, GNO, CL1) and said at least one item of caller line identity information (CLI) discovered in the examination step are compared, and a decision step in which the decision about answering the phone call is made, and which decision is based on the comparison performed in said comparison step, if the comparison step was carried out.

2. A method according to claim 1, characterised in that in the method in a default value is set for the identification information, whereby said default value is used as said identification information in the comparison step, if the caller line identity information (CLI) is not found out in the examination step.

3. A method according to claim 1, in which method telephone directory information (PN, UN, GNO, CL1) is saved in a mobile terminal (MS), characterised in that at least a first and a second priority class is specified, whereby one of said priority classes is selected for at least one item of telephone directory information (PN, UN, GNO, CL1) saved in the mobile terminal (MS), and that at least one item of saved directory information (PN, UN, GNO, CL1) is used as reference information, whereby an examination step is also carried out in the method, in which step the priority class selected for the caller is found out on the basis of said telephone directory information (PN, UN, GNO, CL1), whereby in the decision step the decision about answering the call is made on the basis of the priority class selected for the caller.

4. A method according to claim 3, characterised in that the phone call of a caller belonging to the first priority class is answer substantially immediately after the decision step.

5. A method according to claim 3, characterised in that the phone call of a caller belonging to the second priority class is not answered when the receiver has an active packet-switched connection.

6. A method according to claim 5, characterised in that a user defined user busy (UDUB) signal is produced in the mobile terminal (MS), if a decision not to answer the call is made in the decision step.

7. A method according to claim 5, characterised in that information (PN, UN) for identifying the caller is saved, whereby after the termination of the packet-switched connection the user of a mobile terminal (MS) is sent notification of an arrived call and information (PN, UN) for identifying the caller.

8. A method according to claim 3, characterised in that in the method a third priority class is also specified, whereby when a phone call of a caller classified to the third priority class is coming, the user of the mobile terminal is sent notification about the incoming call and information (PN, UN) for identifying the caller, whereby the user can select whether to answer the call or not.

9. A method according to claim 1, characterized in that at least a telephone number is used as said caller line identity information (CLI).

10. A method according to claim 9, characterised in that in said examination step, said caller line identity information (CLI) is compared to the telephone numbers (PN) saved in the telephone Directory information (PN, UN, GNO, CL1).

11. A method according to claim 3, characterised in that at least one caller group is specified in the mobile terminal, whereby one caller group can be selected for each item of caller's telephone directory information (PN, UN, GNO, CL1), that a priority class is selected for the caller group, that information about the caller group selected for the caller is saved in the telephone directory information (PN, UN, GNO, CL1), and that in the examination step the caller group selected for the caller is found out from the telephone directory information (PN, UN, GNO, CL1), whereby said priority class selected for the caller group is used in the decision step, when the decision about answering the phone call is made.

12. A method according to claim 3, characterised in that in the method a default value is set for the priority class, whereby said default value is used as the priority class in the decision step, if the priority class is not found out in the examination step.

13. A method according to claim 1, characterised in that at least the telephone number (CLI) and name (UN) are saved in the caller's telephone directory information (PN, UN, GNO, CLI).

14. A method according to claim 1, characterised in that the command to interrupt the packet-switched connection is used as the reference information, whereby it is examined in the comparison step if the received identification information includes a command to interrupt the packet-switched connection, whereby if the identification information includes a command to interrupt the packet-switched connection, the decision about answering the call is made in the decision step.

15. A mobile terminal (MS), which comprises means (RF) for answering the incoming call in a situation where there is a packet-switched connection active in the mobile terminal (MS), which mobile terminal (MS) comprises means (MEM) for saving at least one reference item (PN, UN, GNO, CL1), and means (RF) for receiving information (CLI) associated with the incoming call, characterised in that the mobile terminal (MT) also comprises at least:
 examination means (CONTROL, DB1) for finding at least one item of caller line identity information (CLI) from information received associated with the incoming call,
 comparison means (CONTROL, DB1) for comparing at least one reference item (PN, UN, GNO, CL1) with at least one item of caller line identity information (CLI) discovered in the examination means and for producing a comparison result, and
 decision means (CONTROL) for making the decision about answering the phone call on the basis of the comparison result produced by the comparison means.

16. A mobile terminal (MS) according to claim 15, characterised in that it comprises means (CONTROL, KB) for setting a default value for the caller line identity information (CLI), whereby said examination means (CONTROL, DB1) comprise means for selecting said default value for use as said caller line identity information in the comparison means, if the caller line identity information (CLI) was not found out in the examination step.

17. A mobile terminal (MS) according to claim 15, which comprises means (MEM) for saving telephone directory information (PN, UN, GNO, CL1), characterised in that at least a first and a second priority class have been specified, and that the mobile terminal (MT) also comprises at least:
 means (K1, K3, K4) for selecting a priority class for at least one item of said telephone directory information (PN, UN, GNO, CL1),
 means (CONTROL, DB1) for using at least one item of saved telephone directory information (PN; UN, GNO), CL1) as reference information, and
 examination means (CONTROL, DB2) for finding out the priority class selected for the caller on the basis of said telephone directory information (PN, UN, GNO, CL1), whereby the decision means comprise means (CONTROL, MEM) for making the decision about answering the call on the basis of the priority class selected for the caller.

18. A mobile terminal (MS) according to claim 17, characterised in that it incorporates an arrangement that the phone call of a caller belonging to the first priority class is answered substantially immediately.

19. A mobile terminal (MS) according to claim 17, characterised in that it incorporates an arrangement that the packet-switched connection is continued without answering the call if the caller belongs to the second priority class.

20. A mobile terminal (MS) according to claim 19, characterised in that the mobile terminal (MS) comprises means (RF) for producing a user defined user busy (UDUB) signal.

21. A mobile terminal (MS) according to claim 19, characterised in that it comprises means (MEM) for saving caller identification information (PN, UN), and means (DP)

for notifying of the incoming call and for showing the caller's identification information (PN, UN) to the user of the mobile terminal (MS) after the termination of the packet-switched connection.

22. A mobile terminal (MS) according to claim 17, characterised in that a third priority class has also been specified, whereby the mobile terminal (MS) comprises means (DP) for notifying of the incoming call and showing the caller's identification information (PN, UN), if the caller has been classified to the third priority class, and selection means (KB, K1, K2) for notifying the mobile terminal (MS) of the user's decision about answering the call.

23. A mobile terminal (MS) according to claim 17, characterised in that said caller line identity information (CLI) comprises at least a telephone number (PN).

24. A mobile terminal (MS) according to claim 23, characterised in that said examination means comprise means (CONTROL) for comparing said caller line identity information (CLI) to the telephone numbers (PN) saved in the telephone directory information (PN, UN, GNO, CL1).

25. A mobile terminal (MS) according to claim 17, characterised in that at least one caller group has been formed in the mobile terminal (MS), whereby the mobile terminal (MS) comprises means (K1, K3, K4) for selecting a caller group for each item of caller's telephone directory information (PN, UN, GNO, CL1), means (K1, K3, K4) for selecting a priority class for the caller group, means (MEM) for saving information about the caller group selected for the caller in the telephone directory information (PN, UN, GNO, CL1), that said examination means comprise means (CONTROL) for finding out the caller group selected for the caller from the telephone directory information (PN, UN, GNO, CL1), and that the decision means comprise means (CONTROL) for making the decision about answering the call on the basis of said priority class of the caller group.

26. A mobile terminal (MS) according to claim 17, characterised in that it comprises means (CONTROL, KB) for setting a default value for the priority class, whereby said comparison means (CONTROL, DB1) comprise means for selecting said default value of the priority class for use as said priority class in the decision means, if the priority class was not discovered.

27. A mobile terminal (MS) according to claim 17, characterised in that the caller's telephone directory information (PN, UN, GNO, CL1) comprise at least the telephone number (CLI) and name (UN).

28. A mobile terminal (MS) according to claim 15, characterised in that at least one item of reference information (PN, UN, GNO, CL1) comprises a command to interrupt the packet-switched connection, whereby the comparison means (CONTROL, DB1) comprise means for comparing the received identification information to the command to interrupt the packet-switched connection.

29. A data transfer system (NW1) comprising means (SGSN, GGSN) for establishing a packet-switched connection between a mobile communication network (NW1) and a mobile terminal (MS), means (MSC) for initiating a telephone call between the mobile communication network (NW1) and the mobile terminal (MS), means (MSC, PSTN) for associating at least one item of caller line identity information (CLI) with the telephone call, and means (MEM) for saving at least one reference item (PN, UN, GNO, CL1), and which mobile terminal (MS) comprises means (RF) for answering an incoming call in a situation where a packet-switched connection is active in the mobile terminal (MS), characterised in that the data transfer system (NW1) also comprises at least:

examination means (CONTROL, DB1) for finding at least one item of caller line identity information (CLI) from information received associated with the incoming call in the mobile terminal (MS), comparison means (CONTROL, DB1) for comparing at least one reference item (PN, UN, GNO, CL1) with the at least one item of caller line identity information (CLI) discovered in the examination means and for producing a comparison result, and decision means (CONTROL) for making the decision about answering the phone call in the mobile terminal (MS) on the basis of the comparison result produced by the comparison means.

30. A data transfer system (NW1) according to claim 29, in which a mobile terminal (MS) comprises means (MEM) for saving telephone directory information (PN, UN, GNO, CL1), characterised in that at least a first and a second priority class have been specified, and that the mobile terminal (MT) also comprises at least:

means (K1, K3, K4) for selecting a priority class for at least one saved telephone directory item (PN, UN, GNO, CL1), means (CONTROL, DB1) for using at least one saved telephone directory item (PN; UN, GNO, CL1) as a reference item, and examination means (CONTROL, DB2) for finding out the priority class selected for the caller on the basis of said telephone directory items (PN, UN, GNO, CL1), whereby the decision means comprise means (CONTROL, MEM) for making the decision about answering the call on the basis of the priority class selected for the caller.

31. A data transfer system (NW1) according to claim 29, characterised in that at it comprises means (P, PSTN, MSC) for sending a command to interrupt the packet-switched connection in the identification information to be sent to the mobile terminal (MS), whereby the comparison means (CONTROL, DB1) comprise means for comparing the received item of identification information to the command to interrupt the packet-switched connection.

* * * * *